Figure 6:
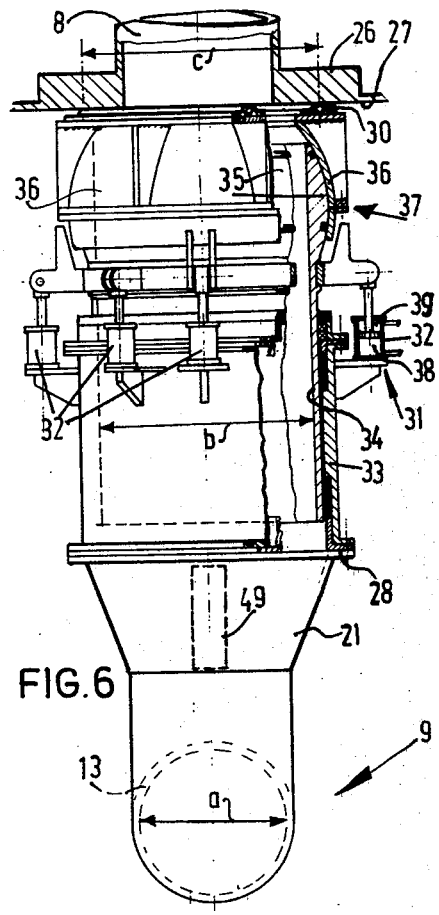

United States Patent [19]

Ravesteyn et al.

[11] 4,083,133
[45] Apr. 11, 1978

[54] SWINGABLE WATER AND SLUSH TUBE ASSEMBLY FOR SUCTION DREDGERS

[75] Inventors: Cornelis Jan Ravesteyn, Jutphaas; Jan de Koning, Amsterdam; Tjako Aaldrik Wolters, Zeist, all of Netherlands

[73] Assignee: Ballast-Nedam Groep N.V., Amstelveen, Netherlands

[21] Appl. No.: 733,065

[22] Filed: Oct. 18, 1976

[30] Foreign Application Priority Data

Oct. 17, 1975 Netherlands .................... 7512247

[51] Int. Cl.² ............................................. E02F 3/90
[52] U.S. Cl. ....................................... 37/72; 137/615; 285/9 R; 285/18; 285/106; 285/137 R; 285/223; 285/325
[58] Field of Search ................ 137/615; 37/72; 285/137 R, 325, 223

[56] References Cited

U.S. PATENT DOCUMENTS

| 2,651,122 | 9/1953 | Brinkman ..................... 37/72 |
| 3,115,352 | 12/1963 | Heerlein ..................... 285/223 X |
| 3,168,334 | 2/1965 | Johnson ...................... 285/223 X |
| 3,944,264 | 3/1976 | Mong et al. ................. 285/137 R |

FOREIGN PATENT DOCUMENTS

| 2,347,614 | 4/1975 | Germany ...................... 37/72 |
| 6,815,148 | 4/1970 | Netherlands .................. 37/72 |

*Primary Examiner*—Clifford D. Crowder
*Attorney, Agent, or Firm*—Snyder, Brown & Ramik

[57] ABSTRACT

In a suction dredger, the connection between the water tube flange and the water duct flange is more reliable in operation, if the slush tube is adapted to turn by means of a rotary gland with respect to the slush tube flange to be rigidly coupled with the floating body, with the slush tube flange being connected through an arm with a water tube piece, while the water tube piece is connected through a flexible tubing with the water tube.

17 Claims, 20 Drawing Figures

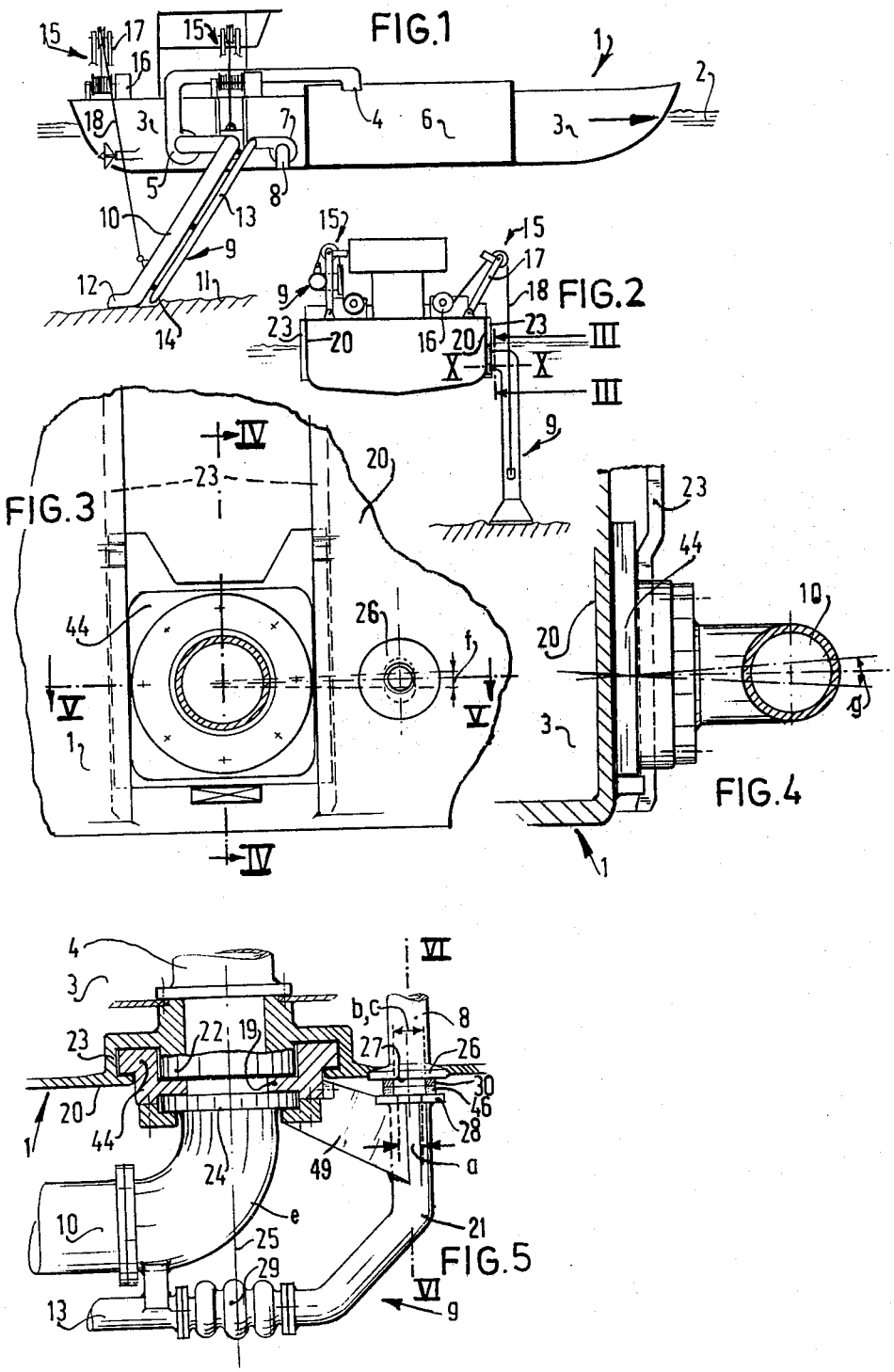

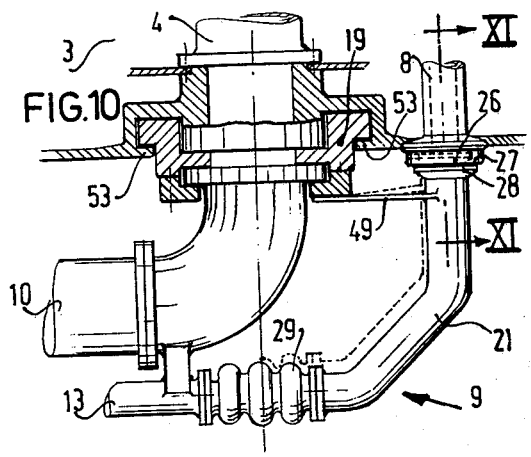
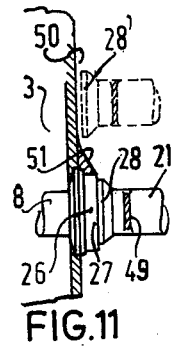
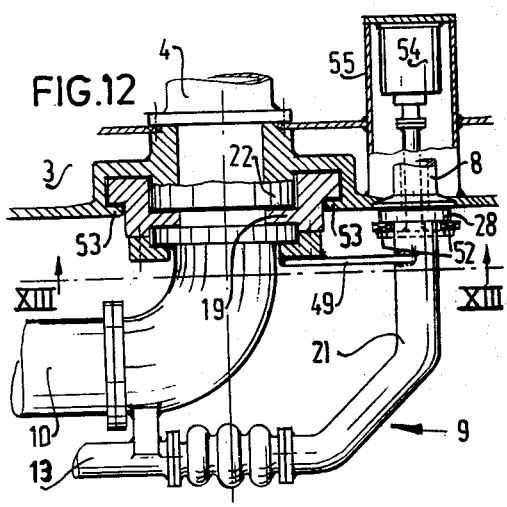
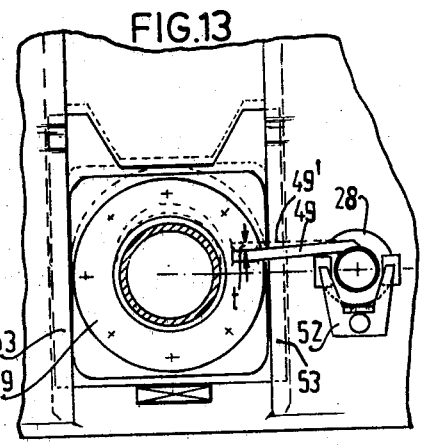
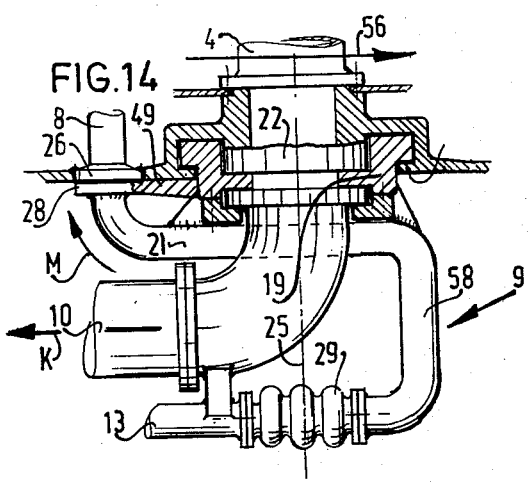
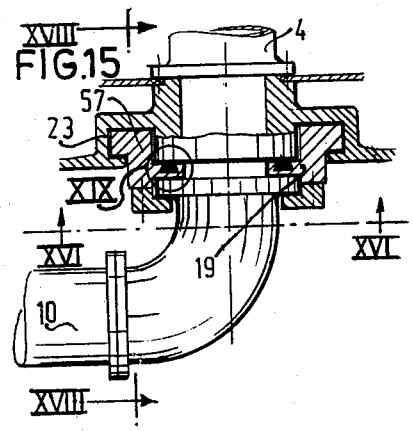

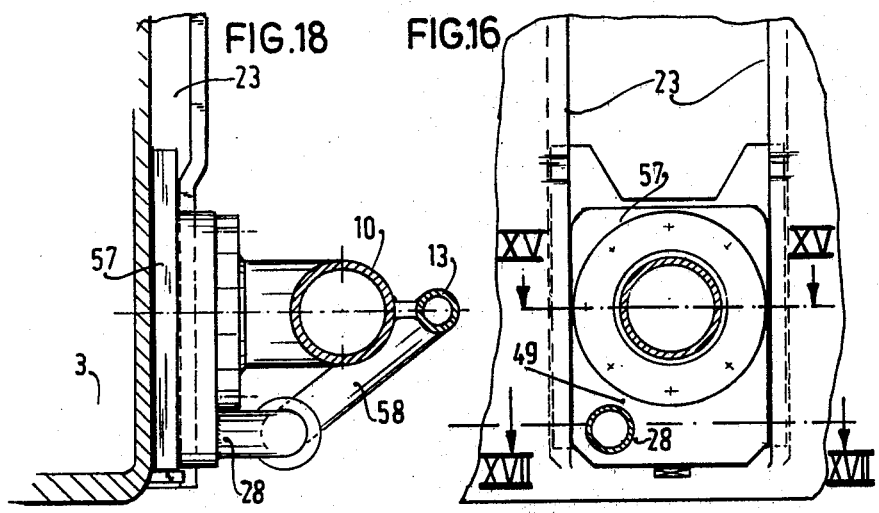
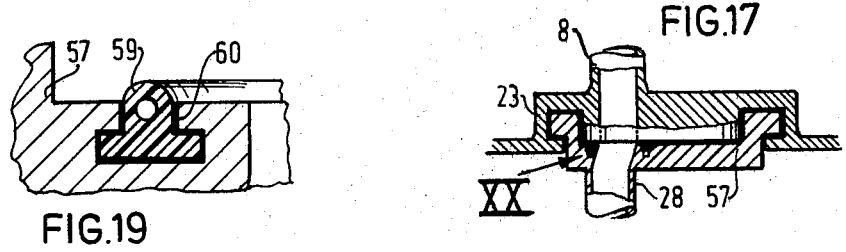
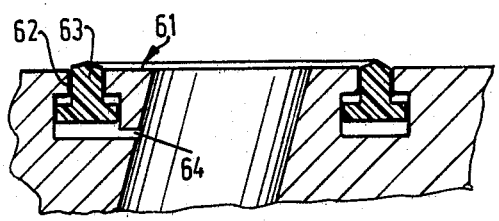

SWINGABLE WATER AND SLUSH TUBE ASSEMBLY FOR SUCTION DREDGERS

The invention relates to a suction dredger comprising a floating body accommodating a slush duct and a water duct, an assembly of a slush tube and a water tube rigidly secured to the former, said assembly being adapted to move outside the floating body, lifting means for lifting the assembly from an operative position beneath the water level into a rest position above the water, a slush tube flange joining, in the operative position, a slush duct flange, a water tube flange joining, in the operative position by means of an adjoining ring in sealing engagement with an adjoining face, a water duct flange, guide means for guiding the slush tube flange along a wall of the floating body, a rotary gland coupling the slush tube with the slush tube flange and a water tube piece coupling the water tube with the water tube flange.

Such a suction dredger is known from the Dutch patent application No. 68 15148, laid up for public inspection. The junction between the water tube flange with the water duct flange is not reliable in operation so that the risk of leakage of this connection is great.

The invention has for its object to provide a greater reliability in operation of the connection between the water tube flange and the water duct flange. For this purpose the suction dredger according to the invention is characterized in that the slush tube is adapted to turn by means of the rotary gland with respect to the slush tube flange to be rigidly coupled with the floating body, said slush tube flange being connected through an arm with a water tube piece, and in that the water tube piece is connected through a flexible tubing with the water tube.

In the suction dredger disclosed in said Dutch patent application No. 68 15148 efforts are made to avoid leakage at the water duct flange by arranging an adjoining ring axially movable on the water tube flange. This adjoining ring is quite vulnerable and is very likely to be damaged. In this respect the invention provides a further development of a suction dredger, which is characterized by at least one axially movable adjoining ring disposed between the water tube flange and the water duct flange and being, in its sealing position, in sealing engagement with an adjoining face, said ring being provided with repelling means for repelling the adjoining ring from the adjoining face. If, viewed in the direction of movement of the suction dredger, the water duct flange is disposed behind the slush duct flange, the water duct flange is automatically sealed, since the water tube flange is vigourously pressed against it.

In a further development of the suction dredger in accordance with the invention the water tube piece is connected with the slush tube flange by means of an arm which deforms elastically when the water tube flange upon lowering of the assembly by the lifting means into the working position abuts against a stop limiting the downward movement of the water tube flange. In a further embodiment of the suction dredger in accordance with the invention the water tube piece is connected with the slush tube flange by means of an elastically deformable arm, whilst the water duct flange extends further outside the floating body than the portion of the downward path of the water tube flange extending above the water duct flange. In these two embodiments the seal of the water duct flange and the water tube flange is constantly subjected to the mechanical spring force of the elastically deformed arm.

The above-mentioned and further features of the invention will be described more fully hereinafter with reference to a drawing.

In the drawing there show schematically

Figure 7:
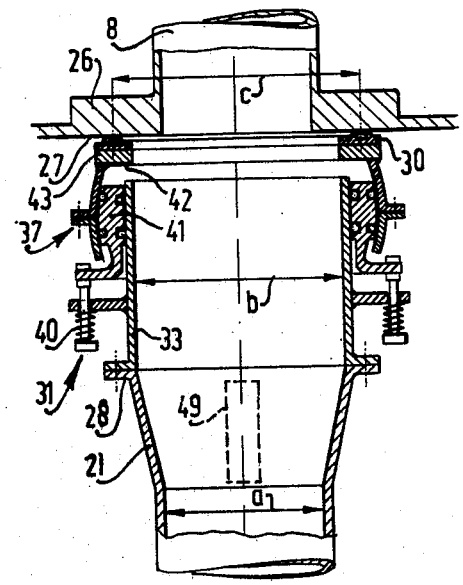
Figure 9:
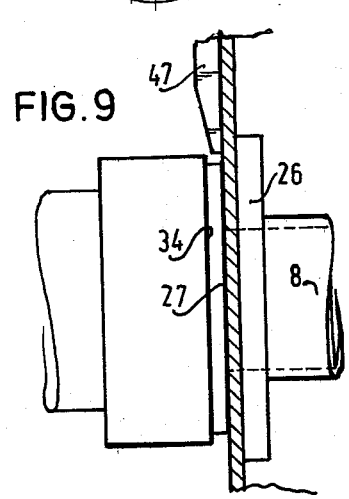
Figure 8:
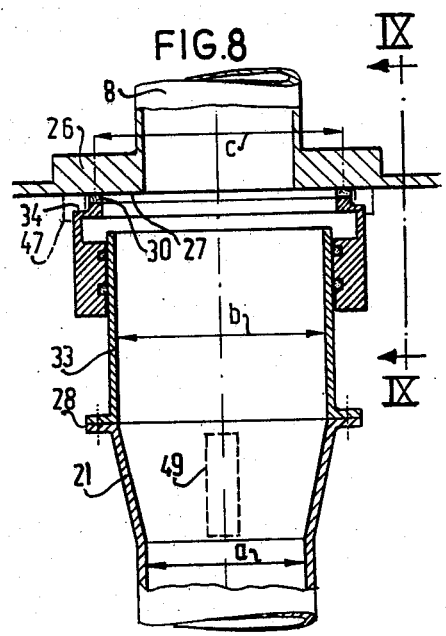

FIGS. 1 and 2 a side and rear elevational view respectively of a suction dredger according to the invention, FIG. 3 an enlarged sectional view taken on the line III—III in FIG. 2, FIG. 4 a sectional view taken on the line IV—IV in FIG. 3, FIG. 5 a sectional view taken on the line V—V in FIG. 3, FIGS. 6, 7 and 8 each an enlarged, axial sectional view taken on the line VI—VI in FIG. 5 of relatively different embodiments of the suction dredger in accordance with the invention, FIGS. 10, 12, 14 and 15 enlarged axial sectional views taken on the line X—X in FIG. 2 for relatively different embodiments of the suction dredger in accordance with the invention, FIG. 9 an elevational view in the direction of the arrows IX in FIG. 8, FIG. 11 an elevational view in the direction of the arrows XI in FIG. 10, FIG. 13 an elevational view in the direction of the arrows XIII in FIG. 12, FIG. 16 a sectional view taken on the line XVI—XVI in FIG. 15, FIG. 17 a sectional view taken on the line XVII—XVII in FIG. 16, FIG. 18 an elevational view in the direction of the arrows XVIII in FIG. 15, FIG. 19 on an enlarged scale a detail XIX of FIG. 15, and FIG. 20 on an enlarged scale a detail XX in FIG. 17.

Each of the embodiments shown of a suction dredger 1 in accordance with the invention comprises a floating body 3 on the water 2 having a hold 6. The suction dredger 1 furthermore comprises on each side of the floating body 3 a slush duct 4 opening out in the hold 6, a suction pump 5 included in the slush duct 4, a water duct 8 arranged in the floating body 3, a water pump 7 included in the water duct 8 and sucking up water 2 and subjecting it to a pressure of, for example, 10 atmospheres, an assembly 9 of a slush tube 10 having a suction head 12 dragging along the ground 11 to be dredged and a water tube 13 rigidly connected with the slush tube 10 having a nozzle 14 for injecting water into the ground 11, which assembly 9 is movable outside the floating body 3, lifting means 15 for lifting the assembly 9 from an operative position beneath the water 2, shown in the right-hand part of FIG. 2 into a rest position above the water 2, indicated in the left-hand part of FIG. 2, said means 15 mainly comprising a winch 16, a pivotable frame 17 and a lifting cable 18, a slush tube flange 19 engaging, in the operative position, a slush duct flange 22 secured near the wall 20 of the floating body 3, guide means formed by rails 23 and a sliding piece 44 guided in the former for guiding the slush tube flange 19 along the wall 20 of the floating body 3, a rotary gland 24 on one end of the elbow portion e of the slush tube 10 rotatably coupling the slush tube 10 with the slush tube flange 19 and allowing a rotation of the slush tube 10 about an axis 25 with respect to the floating body 3, a water tube flange 28 engaging, in the operative position, a water duct flange 26 of the water duct 8 fastened near the wall 20 to the floating body 3 and a water tube piece 21 coupling the water tube 13 with the water tube flange 28 and being connected with the water tube 13 through flexible conduit means in the form of a flexible tubing 29 in order to allow a turn of the water tube 13 about the axis 25. The slush tube flange 19 is rigidly secured by means of an arm 49 to the water tube piece 21.

Referring to FIGS. 3 and 4, the sliding piece 44 and the rails 23 have so much play, so many structural inaccuracies and such an elastic deformation that the sliding piece 44 can shift through angles *f* (FIG. 3) and *g* (FIG. 4) so that it is difficult to connect the slush tube flange 19 and the water tube flange 28 satisfactorily — that is to say, without impermissible leakage — with the slush duct flange 22 and the water duct flange 26 respectively. In order to permit a shift of the water tube flange 28 through the angle *f* with respect to the water duct flange 26, these flanges have, as compared with the passage *a* of the water tube piece 21, a large adjoining face 27, whilst the passage *b* of the water duct 8 and the passage *c* of the adjoining ring 30 shown in FIGS. 5, 6 and 7 are appreciably larger than the passage *a*.

Referring to FIG. 5, the adjoining ring 30 is made of steel and vulcanized to the water tube flange 28 with the interposition of an elastic, for example, rubber ring 46. Thus the adjoining ring 30 is matching the adjoining face 27 to some extent independently of the position of the slush tube flange 19.

From each of FIGS. 6, 7 and 8 it will be apparent that the water tube flange 28 and the water duct flange 26 have disposed between them an axially movable adjoining ring 30 of elastic material, for example, rubber, in sealing engagement, in its sealing state, with an adjoining face 27, said ring 30 being provided with repelling means 31 for repelling the adjoining ring 30 from the adjoining face 27.

Referring to FIG. 6, the repelling means 31 comprise a plurality of fluid-, for example, air- or liquid-energized cylinders 32 pushing the adjoining ring 30 out of its sealing position, said cylinders 32 being operative between a tubing 33 fastened to the water tube flange 28 and a tubing 34 telescopically displaceable in the former and having a spherical face 35 carrying a spherical shell 36 of a ball joint 37. By supplying fluid to the chambers 38 of the cylinders 32 the adjoining ring 30 is pushed into its sealing position at the adjoining face 27, where the ball joint 37 ensures a flat engagement of the adjoining ring 30. By supplying fluid to the chambers 39 of the cylinders 32 the adjoining ring 30 is pushed back in order to avoid a shift to the adjoining ring 30 across the adjoining face 27 and the wear involved, when the assembly 9 is lifted.

The repelling means 31 shown in FIG. 7 are formed by a plurality of springs 40 pushing back a sliding ring 41 surrounding the tubing 33 together with the ball joint 37 and the associated adjoining ring 30 from the adjoining face 27, when the pressure in the water duct 8 and in the water tube 13 becomes low. If a high pressure of, for example, 10 atmospheres is prevailing therein, the available water exerts pressure on the pressure face 42 of the steel ring 43 holding the adjoining ring 30 and thus presses the adjoining ring 30 against the adjoining face 27.

FIG. 8 corresponds with FIG. 6, but the water tube flange 28 is not connected through a ball joint 37 with the adjoining ring 30 and the repelling means 31 are formed by brackets 47 fastened to the wall 20 and engaging the tubing 34, when the water tube flange 28 is lifted, the adjoining ring 30 being pushed out of its operative position from the adjoining face 27.

Referring to each of the FIGS. 10 to 13 the water tube piece 21 is connected with the slush tube flange 19 by means of an arm 49, for example, a steel rod, which is elastically deformable. From FIGS. 10 and 11 it will be seen that the water duct flange 26 extends further outside the floating body 3 than the portion of the downward movement path 50 of the water tube flange 28 extending above the water duct flange 26 so that during the lowering of the water tube flange 28 the rod 49 is stressed, when the water tube flange 28 ascends the sloping rim 51 of the water duct flange 26. Thus in its operative position the water tube flange 28 engages the adjoining face 27 under the stress of the rod 49.

Referring to FIG. 12, the water tube flange 28 is connected by means of the rod 49 with the slush tube flange 19 in a manner such that the water tube flange 28, when the assembly 9 is lowered, arrives earlier at its working position and then abutts against a stop 52 in the form of a hook limiting the downward movement, while the slush tube flange 19 continues its movement over a small distance *t*, the rod 49 being thus bent out of the position 49' indicated in FIG. 13 by broken lines into the working position indicated by solid lines, the slush tube flange 19 being consequently rigidly urged against the slush duct flange 22 by the wedge-effect of the rail ends 53. The stop 52 forms a drawhook engaging the water tube flange 28 and being driven by a fluid-energized cylinder 54 in a water-tight casing 55 in the floating body 3.

Referring to FIG. 14, viewed in the direction of movement 56 of the suction dredger 1, the water duct flange 26 is disposed behind the slush duct flange 22. This has the advantage that during the dredging operation a rearwardly directed force K exerts a moment M on the assembly 9. The slush tube flange 19 rigidly clamped by wedge effect against the slush duct flange 22 does not bring about an insurmountable problem with respect to sealing and the difficult seal between the water tube flange 28 and the water duct flange 26 is ensured in that the water tube flange 28 is firmly pressed by the moment M against the water duct flange 26. The water tube 13 is connected through a flexible tubing 29 in the direction of the axis 25 with a U-shaped bent tubing 58 and a water tube piece 21 with the water tube flange 28.

Referring to FIGS. 15 to 20, the slush tube flange 19 and the water tube flange 28 are rigidly secured to a sliding plate 57 adapted to slide on rails 23 fastened to the floating body 3, a portion of said plate 57 located between the flanges 28 and 19 forming an arm 49 connecting the slush tube flange 19 with the water tube piece 21. These flanges 28 and 19 are located near one another inside the rails 23 and are both firmly held in place. An annular groove 60 of the slush tube flange 19 is provided with an elastic sealing ring 59.

Referring to FIG. 20, the water tube flange 28 has, in its contact face 61, an annular groove 62 holding an axially slidable sealing ring 63, the annular groove 62 behind the sealing ring 63 communicating through a channel 64 with the water conveying channel of the water tube flange 28.

What is claimed is:

1. A suction dredger comprising a floating body accommodating a slush duct and a water duct, said water duct having a water duct flange and said slush duct having a slush duct flange, an assembly of a slush tube and a water tube rigidly secured together, lifting means for moving the assembly between an operative position beneath the water level and a rest position above the water, guide means on said body for guiding said assembly during said movement, said assembly further including a slush tube flange non-rotatably engaged with said guide means and slidably engaged therewith for movement into non-rotatable registry with said slush duct flange when said assembly is in said operative position thereof, a rotary gland fixed at one end to said slush tube and rotatably connected at its other end to said slush tube flange whereby said assembly is rotatable about a predetermined axis with respect to said slush tube flange when said assembly is in said operative position thereof, a water tube piece, an arm fixing said slush tube flange to said water tube piece, a water tube flange fixed to one end of said water tube piece and registered with said water duct flange in the operative position of said assembly, sealing means for effecting a seal between said water tube flange and said water duct flange, and flexible tubing connecting the other end of said water tube piece to said water tube whereby said water tube is free to swing about said axis while said water tube piece remains in fixed registry with said water duct.

2. A suction dredger as defined in claim 1 wherein said sealing means comprises a metal ring and an elastic ring joined thereto.

3. A suction dredger as claimed in claim 1, wherein at least one axially movable adjoining ring is disposed between the water tube flange and the water duct flange and being, in its sealing position with said water duct flange, in sealing engagement with an adjoining face of the water duct flange, said ring being provided with repelling means for repelling the adjoining ring from the adjoining face.

4. A suction dredger as claimed in claim 3, wherein the repelling means comprises at least one spring repelling the adjoining ring out of its sealing position.

5. A suction dredger as claimed in claim 3, wherein the repelling means are formed by at least one fluid-energized cylinder repelling the adjoining ring from its sealing position.

6. A suction dredger as claimed in claim 5, wherein the adjoining ring is urged into its sealing position by the cylinder.

7. A suction dredger as claimed in claim 3, wherein the repelling means are formed by at least one guide fastened to the floating body and repelling the adjoining ring out of its sealing position.

8. A suction dredger as claimed in claim 3, wherein the adjoining ring is connected with the water tube flange through a ball joint.

9. A suction dredger as claimed in claim 1, wherein a drawhook engages the water tube flange and is driven by at least one fluid-energized cylinder disposed in the floating body.

10. A suction dredger as claimed in claim 1, wherein, viewed in the direction of movement of the suction dredger, the water duct flange is disposed behind the slush duct flange.

11. A suction dredger as claimed in claim 1, wherein the water tube piece is connected with the slush tube flange by means of an arm which deforms elastically when the water tube flange upon lowering of the assembly by the lifting means into the working position abuts against a stop limiting the downward movement of the water tube flange.

12. A suction dredger as claimed in claim 1, wherein the water tube piece is connected with the slush tube flange by means of an elastically deformable arm and in that the water duct flange extends further outside the floating body than the portion of the downward path of the water tube flange extending above the water duct flange.

13. A suction dredger as claimed in claim 1, wherein the water tube flange has an annular groove in its face adjoining the water duct flange for receiving an axially displaceable sealing ring, the annular groove communicating behind the sealing ring with the water conveying channel of the water tube flange.

14. A suction dredger as claimed in claim 1, wherein the slush tube flange and the water tube flange are rigidly connected with a sliding plate slidable along rails fastened to the floating body and are locating within said rails.

15. A suction dredger comprising in combination:
   a bouyant hull, a suction pump carried by said hull and having an intake conduit extending through said hull below the water level thereof to define a slush duct;
   a slush tube flange having an opening therethrough and guide means mounted on said hull exteriorly thereof for vertically guiding said flange along said hull as said flange is moved from a rest position above said water line to an operative position in which said opening of the flange is essentially registered with said slush duct, said guide and said flange being shaped such that said flange is sealingly urged toward said slush duct and is located in essentially non-rotatable position with respect to said hull when said flange is in said operative position;
   a slush tube having an elbow portion at one end which is rotatably connected with said flange in registry with said opening, said slush tube terminating in a suction nozzle;
   a water pump carried by said hull and having an outlet conduit extending through said hull below said water line to define a water duct disposed in predetermined spaced relation to said slush duct;
   a water tube flange having an opening therethrough and arm means connecting said water tube flange to said slush tube flange for disposing the opening in said water tube flange substantially in registry with said water duct when said slush tube flange is disposed in said essentially non-rotatable operative position;
   a water tube extending alongside said slush tube and rigidly connected therewith, and flexible conduit means flexibly communicating said water tube with said water tube flange whereby rotational motions of said water tube and slush tube minimally affect the orientation of said water tube flange when said slush tube flange is in said operative position; and
   power means on said hull and connected with said slush tube for moving said slush tube flange between said rest and operative positions and for supporting said slush tube and said water tube in downwardly inclined position.

16. A suction dredger as defined in claim 15 wherein said arm means is rigid, and including a resilient ring seal between said water tube flange and said water duct which is maintained under compression by said arm means.

17. A suction dredger as defined in claim 16 wherein the opening in said water tube flange is smaller than the opening defining said water duct, and said resilient ring seal presents an opening at least as large as said water duct opening whereby to accomodate for misalignment between said water tube flange and said water duct.

* * * * *